US006169281B1

(12) United States Patent
Chen et al.

(10) Patent No.: US 6,169,281 B1
(45) Date of Patent: Jan. 2, 2001

(54) APPARATUS AND METHOD FOR DETERMINING SIDE WALL PROFILES USING A SCANNING PROBE MICROSCOPE HAVING A PROBE DITHERED IN LATERAL DIRECTIONS

(75) Inventors: Dong Chen, Boca Raton, FL (US); Edwin Flecha, Austin, TX (US); James Michael Hammond, Boca Raton, FL (US); Yves Corfield Martin, Ossining, NY (US); Kenneth Gilbert Roessler, Boca Raton, FL (US)

(73) Assignee: International Business Machines Corporation, Armonk, NY (US)

( * ) Notice: Under 35 U.S.C. 154(b), the term of this patent shall be extended for 0 days.

(21) Appl. No.: 09/124,302

(22) Filed: Jul. 29, 1998

(51) Int. Cl.[7] .............................. H01J 37/26; G01B 7/34; G01B 5/28
(52) U.S. Cl. ...................... 250/234; 250/216; 250/306; 250/307; 73/105
(58) Field of Search ................................ 250/234, 235, 250/216, 306, 307; 73/105

(56) References Cited

U.S. PATENT DOCUMENTS

| 5,107,114 | 4/1992 | Nishioka et al. ................... 250/306 |
| 5,186,041 | 2/1993 | Nyyssonen ............................. 73/105 |
| 5,283,442 | 2/1994 | Martin et al. ......................... 250/561 |
| 5,321,977 | 6/1994 | Clabes et al. ........................... 73/105 |
| 5,347,854 | 9/1994 | Martin et al. ........................... 73/105 |
| 5,432,346 | 7/1995 | Nose et al. ............................ 250/306 |
| 5,503,010 | 4/1996 | Yamanaka .............................. 73/105 |
| 5,589,686 | 12/1996 | Ohara .................................. 250/306 |
| 5,801,381 | * 9/1998 | Flecha et al. ......................... 250/306 |
| 5,907,096 | * 5/1999 | Chen ..................................... 73/105 |
| 6,079,254 | * 6/2000 | Chen et al. ............................. 73/105 |

* cited by examiner

Primary Examiner—John R. Lee
(74) Attorney, Agent, or Firm—Ronald V. Davidge; Richard A. Tomlin

(57) ABSTRACT

The probe tip of a scanning probe microscope is scanned either along an X- or Y-direction of the apparatus, or along a scan line forming an acute angle with both the X- and Y-directions. During scanning, an excitation vibration is applied in the Z-direction, perpendicular to the surface of the sample being scanned. In a first mode of operation, a dithering vibration is applied to the probe tip, along the scan line. In a second mode of operation, the probe tip is dithered in a circular motion, which is used to identify the direction in which a wall extends along the sample surface. Alternately, in a third mode of operation, the probe tip is dithered in X- and Y-directions at differing vibrational frequencies to identify this direction of a wall. When this direction is identified, the probe proceeds straight up or down the wall to obtain an accurate profile thereof.

28 Claims, 7 Drawing Sheets

APPARATUS AND METHOD FOR DETERMINING SIDE WALL PROFILES USING A SCANNING PROBE MICROSCOPE HAVING A PROBE DITHERED IN LATERAL DIRECTIONS

BACKGROUND OF THE INVENTION

1. Field of the Invention

This invention relates to a method for examining surface anomalies such as grooves and ridges in a sample surface, and, more particularly, to establishing the profiles of such anomalies using a scanning microscope dithered in mutually perpendicular lateral directions.

2. Description of the Related Art

The capability of measuring the profiles of circuit lines forming ridges on the surfaces of printed circuit boards and circuit chips, and the profiles of various types of very small trenches extending along substrate surfaces is becoming increasingly important in the field of micro-metrology. The alternative use of optical instrumentation has physical limitations for measuring objects smaller than one micron. Furthermore, the second alternative use of a scanning electron microscope has disadvantages caused by the difficulty of preparing the sample and performing measurements. The sample has to be sectioned before the measurements can be made, with measurements of a particular line or trench being made at only one location. Measurements must be taken in a vacuum environment, and the spatial accuracy of measurements is limited by effects resulting from interactions between the electron beam and the sample being measured.

FIG. 1 is a transverse cross sectional elevation of a trench in a sample surface 1, together with a very sharp probe tip 2, used in conventional scanning probe microscopy to determine surface features of the sample surface 1. This probe tip 2 is vibrated in a direction, generally called the "Z-direction," perpendicular to the overall surface 1 of the sample being measured, while relative motion between the probe 2 and the sample surface 1 is established along the surface of the sample in a scanning direction, such as the X-direction shown. At the end of a predetermined scanning motion, relative motion between the probe and the sample is established along the surface of the sample in a direction perpendicular to the scanning direction. This motion is used to begin a new scan line, lying parallel to the preceding scan line, so that a predetermined portion of the sample surface is traversed by a raster pattern. In scanning force microscopy, the probe tip 2 is fastened to the distal end of a cantilever, the proximal end of which is vibrated in the Z-direction at a constant amplitude and frequency. Under these conditions, the amplitude of the resulting vibration of the tip 2 depends on the level of engagement between the probe tip 2 and the sample surface 1. Thus, a servo loop is established to move the proximal end of the cantilever in the Z-direction to maintain a constant amplitude of vibration of the probe tip 2. Since the resulting movement of the proximal end of the cantilever follows variations of the sample occurring in the Z-direction as the probe is scanned in the X-direction, the driving signal generated in the servo loop to cause such movement is stored as a signal representing Z-direction variations in the sample surface 2.

While these conventional methods are useful for examining a number of types of sample surfaces with relatively gradual upward and downward slopes, serious limitations are presented when such methods are used to examine surfaces having ridges and troughs, such as the trough 6 of FIG. 1. The angle of inclination at which movement of the probe tip 2 can move upward or downward to follow the shape of the sample surface 1 is limited both by the fact that probe vibration is only in the Z-direction and by the physical shape of the probe. In the example of FIG. 1, the probe tip 2, traveling in the X-direction, first contacts the upper edge 8 of an undercut wall surface 10. As changes in the pattern of vibration indicate increased contact between the probe tip 2 and the sample surface 1, the tip 2 is moved upward, remaining in contact with the edge 8. Thus, the actual shape of the undercut wall surface 10 is not reflected in the movement of the probe tip 2, which is used as a measurement of the surface 10.

Furthermore, this conventional method introduces the possibility of a "crash" occurring between the probe tip 2 and an upward-extending wall surface, in the event that the probe 2 cannot be raised fast enough to clear the wall surface with continuing movement in the scan direction. Such an event can be expected to damage both the probe 2 and the sample surface 1.

Thus, when the conventional method of FIG. 1 is considered, what is needed is a method allowing the probe tip to follow the sample surface in spite of variations in the angle of inclination of wall surfaces and to prevent crashes between the probe tip and upward-extending surfaces.

A U.S. application, Ser. No. 08/861,118, filed May 21, 1997, now U.S. Pat. No. 5,801,381, having a common assignee with the present invention, the disclosure of which is hereby incorporated by reference, describes a method for preventing such a crash. In this method, the feedback signal developed to indicate the level of movement of the probe tip in the Z-direction needed to satisfy the predetermined condition of engagement between the probe tip and sample surface is compared with a stored threshold value corresponding to a maximum distance through which the probe tip can be driven in the Z-direction during an incremental portion of the scanning movement. The probe tip is then moved in the Z-direction according to the feedback signal, but scanning movement occurs only when the feedback signal is less than the stored value.

In view of the limitations of the conventional method of FIG. 1, a number of methods described in the patent literature have been developed for using scanning probe microscopy to measure the profiles of wall surfaces.

For example, U.S. Pat. No. 5,186,041 to Nyyssonen describes a metrology system for measuring the depth and width of a trench in a sample to be tested with a probe moved relative to the sample. The system detects the proximity of the probe to a surface forming the bottom of the trench and to the sidewalls of the trench. The system adjusts the relative position of the probe and the sample vertically and transversely as a function of the output signals.

FIG. 2 is a lateral elevation of the probe 12, described in U.S. Pat. No. 5,186,041, which has three protuberances to detect the depth and width of the trench. A first protuberance 14 extends downward to sense the bottom of a trench. Lateral protuberances 16 extend in opposite directions, across the width of the trench, from the probe, to detect the side walls of the trench. The apparatus associated with this probe 12 has means for vibrating the probe in either the Z-direction or in the X-direction, together with interferometric apparatus for measuring vibrations in both the Z- and X-directions.

FIG. 3 is a transverse cross-sectional view of a sample surface 18 including a trench 20, with dashed lines 22 indicating movements of the probe of FIG. 2, used to measure the trench. After the surface heights at each side of the trench are measured at points 24, the probe tip 12 is driven downward while being vibrated in the Z-direction to measure the depth of the trench at a central point 26. Next, the probe 12 moved upward through incremental distances, and is alternately driven against each of the opposite sidewalls 28, with the probe being vibrated in the X-direction, as measurements are made at points 30.

U.S. Pat. No. 5,321,977 to Clabes et al describes the use of an integrated tip strain sensor in combination with a single-axis atomic force microscope (AFM) for determining the profile of a surface in three dimensions. A cantilever beam carries an integrated tip stem on which is deposited a piezoelectric film strain sensor. A piezoelectric jacket with four superimposed elements is deposited on the tip stem. The piezoelectric sensors function in a plane perpendicular to that of a probe in the atomic force microscope; that is, any tip contact with a sidewall surface causes tip deflection with a corresponding proportional electrical output. This tip strain sensor, coupled to a standard single-axis AFM tip, allows for three-dimensional metrology while avoiding catastrophic tip crashes.

U.S. Pat. Nos. 5,283,442 and 5,347,854, each to Martin et al., describe methods and apparatus for profiling surfaces, such as sidewalls of a trench or a line, using a scanning force microscope, in which the method provides improved measurement accuracy by controlling the position of the tip responsive to the real-time measured local slope of the surface.

FIG. 4 is a pictorial representation of a flat probe tip 30, extending downward from a cantilever 32, with protuberances 34, 36 at the lower corners of the probe tip 30 being used as described in U.S. Pat. No. 5,283,442 to establish the profile of a sample surface 38 including a trench 40.

FIG. 5 is a graphical representation of the vibration of the probe tip 30 of FIG. 4 in the Z-direction, as detected by a laser interferometer. The actual vibration, at the higher vibration frequency is shown by the curve 42. The envelope 44 of the curve 42 represents the amplitude of tip vibration, which varies with engagement between the probe tip 30 and the sample surface 38. As the vibrating tip 30 approaches a surface to be profiled, the the force gradient between the tip and surface increases, so that the amplitude of tip vibration decreases. If the sample surface being measured is flat and level in the X-direction, the envelope 44 dies not vary. If the surface is inclined in the X-direction, since vibration at the dithering frequency occurs in this direction, the amplitude envelope 44 varies at the dithering frequency. The magnitude of variations in the envelope 44 at the dithering frequency represents the local slope of the sample surface.

FIG. 6 is a graphical representation of a series of actions taken by the apparatus of U.S. Pat. No. 5,283,442 to follow the shape of a curved surface 46 with a protuberance 34 of the probe tip 30. At an initial point 47, the surface normal is indicated by an arrow 48 an angle α with respect to the Z-axis. The system then moves the probe tip along a scanning direction indicated by arrow 50, perpendicular to the surface normal indicated by arrow 48, through an incremental distance ending at point 52. At this point, since the probe tip has moved away from the surface 46, the vibration of the probe tip 30 in the Z-direction is greater than a predetermined control value. Therefore, the probe tip 30 is moved toward point 54 adjacent the surface 46. This movement occurs along an angle θ, which is determined with the aid of a computing system to reduce the likelihood of contact between the tip and the sample surface, particularly at the corners of a trench when the next measurement point is recorded. In this regard, it is noted that the tip protuberance 34 is generally spaced only 20–50 angstroms from the surface being profiled. This process is repeated, with the probe tip being moved along the surface 46 using measurements of both tip engagement with the surface and of the slope, as determined by the curves of FIG. 5.

While, in the apparatus of U.S. Pat. No. 5,283,442, the levels of probe tip vibration in the Z-axis and X-axis (scan direction) are separated from a single signal shown in FIG. 5 by means of the difference between the excitation frequency and the dithering frequency, the apparatus of U.S. Pat. No. 5,347,854 includes a photodetector which separately detects motion in the Z- and X-directions, providing separate signals indicating vibration in these two directions. The ratio between these separate signals is used to determine the local slope of the sample surface being measured.

One problem with the apparatus and methods of U.S. Pat. Nos. 5,186,041 and 5,321,997 arises from the fact that lateral scanning motions occurs only in one scanning direction. The laterally extending protuberances used to sense side walls also extend in this direction or opposite thereto. Therefore, if the probe encounters a sidewall extending upward or downward essentially in a plane not substantially perpendicular to this scanning direction, the rate at which the probe moves upward or downward in contact with the sidewall fails to give an accurate picture of the slope of the sidewall. In particular, problems occur when the sidewall extends essentially perpendicular to the scanning direction. What is needed is a probe tip shaped to provide the same type of indication that a sidewall has been contacted, in spite of the angle of the sidewall with respect to the scanning direction, together with a method for causing relative motion between the probe and the sample so that a uniform type of contact occurs regardless of this angle, and so that, after contact with a sidewall, the probe moves straight up or down the sidewall.

U.S. Pat. Nos. 5,107,114 and 5,589,686 describe apparatus in which the probe tip of a scanning probe microscope is moved through small distances in all three directions.

In particular, U.S. Pat. No. 5,107,114 to Nishioka et al. describes a fine-scanning mechanism for an atomic force microscope including a three-dimensionally displaceable cylindrical piezoelectric element. The free end of the cylindrical piezoelectric element can be displaced in X-, Y, and Z-directions. A first probe is attached to a free end of the cylindrical piezoelectric element. A bimorph piezoelectric element is also attached to the free end of the cylindrical piezoelectric element, being, in itself, one-dimensionally displaceable in the Z-direction. A cantilever is attached to extend from the free end of the bimorph piezoelectric element, so that a free end of the cantilever is adjacently under the first probe. A second probe is attached to extend downward from the free end of the cantilever, into engagement with the sample surface. A stationary sample tray is disposed opposite the second probe. This mechanism is used to scan the first and second probes in synchronization, laterally across the surface of the sample, so that the sample is traversed according to a predetermined pattern.

What is needed is the use of a probe shape suitable for the sensing of walls adjacent anomalies in the sample surface, together with the application of dithering signals to the various sections of the cylindrical piezoelectric element, so that a circular motion of the first and second probes is achieved. Furthermore, what is needed is a method for making a probe move laterally in a direction perpendicular to the face of such a wall as the probe is moved up or down the face. Such motion would make the second probe move in a way which is particularly effective in determining the presence of sidewalls of anomalies and in determining the shape of such sidewalls. Furthermore, what is needed is a means for providing dithering vibration in a scanning direction, so that rapidly rising and falling wall surfaces in the sample surface can be detected and followed.

U.S. Pat. No. 5,589,686 to Ohara describes a method and apparatus for producing real-time continual nanometer scale positioning data of the location of a sensing probe used alternately with a scanning tunneling microscope, an atomic force microscope, or a capacitive or magnetic force field sensing system. The system is used for measuring the probe distance and position relative to an atomic surface or other periodically undulating surface, such as a grating or the like moving relatively with respect to the probe, and between which and the surface there exists a sensing field, through rapid oscillation of the probe under the control of sinusoidal voltages, and the comparison of the phase and amplitude of the output sinusoidal voltages produced by current in the sensing field to provide positional signals indicative of the direction and distance off the apex of the nearest atom or undulation of the surface. Where desired, the positional signals are fed back to control the relative movement of the probe and surface.

Thus, the method of U.S. Pat. No. 5,589,686 is operable only to determine characteristics of a periodically undulating test sample. Another type of test sample would not produce a sinusoidal output signal from the sensing field, as required by the method. What is needed is a method which can determining the characteristics of wall surfaces of anomalies, when such wall surfaces lie at unknown angles and at unknown, non-periodic distances from one another.

SUMMARY OF THE INVENTION

It is a first objective of the present invention to provide a method for traversing the surface of a sample with a scanning microscope probe along an angle determined by the operator without a need to follow the coordinate system of the apparatus.

It is a second objective to provide a method for determining the angle at which an upward- or downward-sloping wall lies along the sample surface by determining the direction in which maximum slope (upward or downward) occurs at the beginning of the wall as it is traversed by the scanning microscope probe.

It is a third objective to provide a method for traversing a sloping wall surface with a scanning microscope in a direction of maximum slope of the wall surface, so that an accurate profile of the wall surface can be obtained.

It is a fourth objective to provide a scanning microscope probe tip having a circular outward protruding ring extending parallel to the sample surface, so that the probe tip can be readily used to inspect sloped surfaces extending at all angles.

According to a first aspect of the present invention, there is provided apparatus for determining topographical features of a sample surface. The apparatus includes a probe tip, a cantilever, X-, Y- and Z drive mechanisms, a detector, first and second demodulators, and a computing system. The probe tip includes a circular protrusion, extending parallel to the sample surface and movable in engagement with the sample surface. The cantilever attaches the probe tip to a probe mounting surface.

The Z-drive mechanism creates relative motion in a Z-direction, perpendicular to the sample surface, between the probe mounting surface and the sample surface, with the relative motion in a Z-direction including movement to retain a level of engagement between the probe tip and the sample surface and an excitation vibration at an excitation frequency of vibration. The X-drive mechanism creates relative motion in an X-direction, parallel to the sample surface, between the probe mounting surface and the sample surface. This relative motion in the X-direction includes a first scanning movement to traverse the sample surface with the probe tip and a first dithering vibration at a first frequency of vibration. The Y-drive mechanism creates relative motion in a Y-direction, parallel to the sample surface, between the probe mounting surface and the sample surface. This relative motion in the Y-direction includes a second scanning movement to traverse the sample surface with the probe tip and a second dithering vibration at a second frequency of vibration.

The detector generates a tip motion output signal in response to vibration of the probe in the Z-direction. The first demodulator generates, in response to the tip motion output signal, a first feedback signal representing an amplitude of vibration of the probe tip. The second demodulator generates, in response to the tip motion output signal, a second feedback signal representing variations in the amplitude of vibration occurring at the first dithering frequency. The computing system controls the X-drive mechanism and the Y-drive mechanism to combine the first scanning movement and the second scanning movement so that the sample is traversed with the probe tip in a scanning direction, which may be along the X- or Y-directions or obliquely dispose from both the X- and Y-directions.

DETAILED DESCRIPTION

Figure 7:
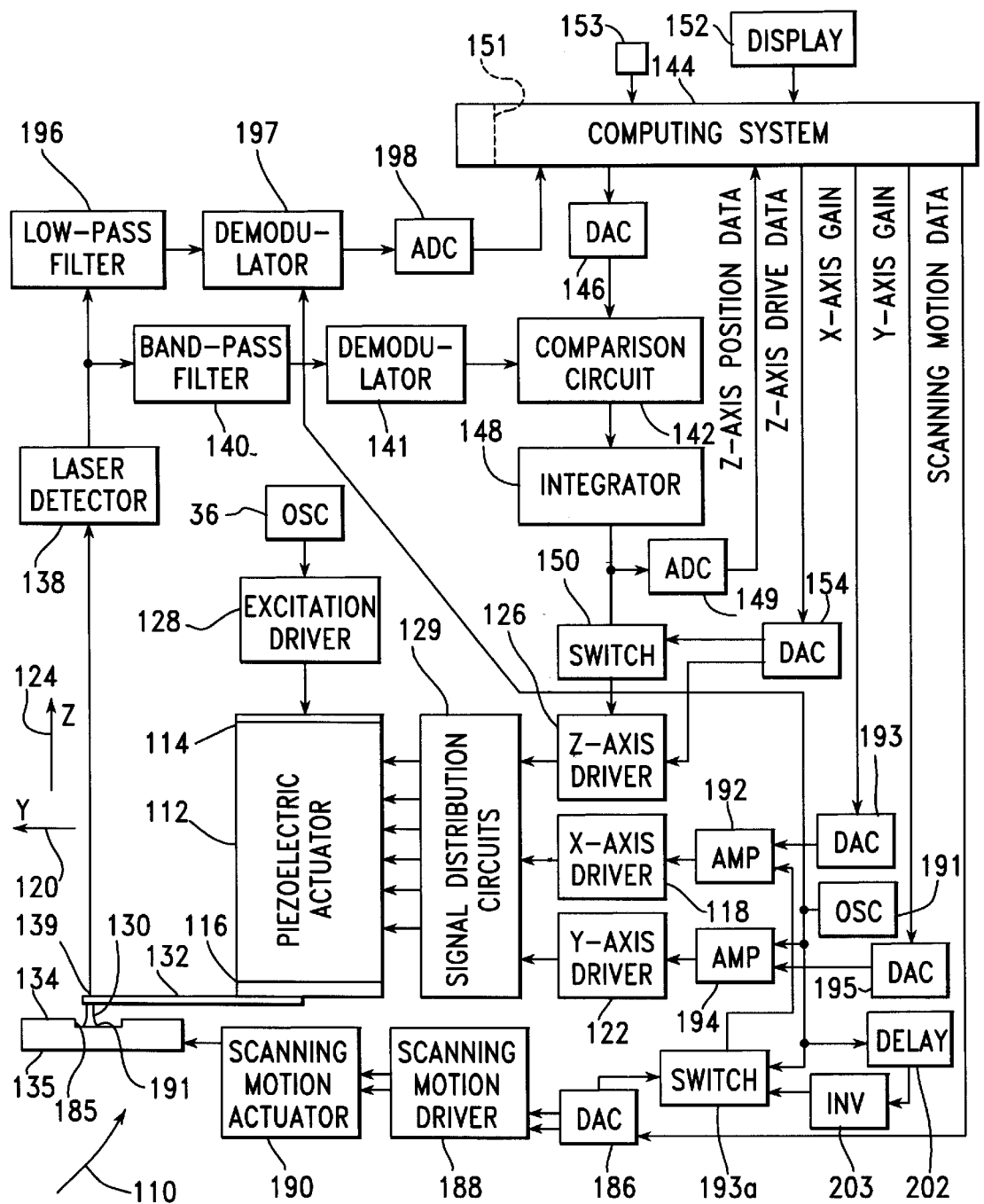
FIG. 7 is a partly schematic side elevation of a scanning force microscope built in accordance with a first embodiment of the present invention.

FIG. 7 is a partly schematic side elevation of a scanning force microscope 110, built in accordance with present invention. The apparatus 110 includes a piezoelectric actuator 112, which extends between a clamped end 114 and a free end 116. The free end 116 moves in an X-axis direction in response to a voltage signal from an X-axis driver 118, in a Y-axis direction of arrow 120 in response to a voltage signal from a Y-axis driver 122, and in a Z-axis direction of arrow 124 in response to a voltage signal from Z-axis driver 126, and also in response to an oscillating voltage signal from excitation driver 128. The outputs of X-axis driver 118, Y-axis driver 122, and Z-axis driver 126 are directed to appropriate electrodes of the piezoelectric actuator 112 through signal distribution circuits 129.

In accordance with a preferred version of the present invention, a surface-sensing probe tip 130 is attached to the free end 116 of piezoelectric actuator 112 by means of a cantilever 132 and a mounting plate 133. During operation of the system, the probe tip 130 is vibrated the Z-axis direction of arrow 124 in engagement with the surface 134 of a sample 135 by the application of an oscillating signal from an oscillator 136 to the excitation driver 128. This vibration of the probe tip 130 occurs at a drive frequency of the oscillator 136, which is preferably somewhat higher than the resonant frequency of the cantilever 132. The vibrating motion of probe tip 130 in the Z-axis direction of arrow 124 is measured by a laser detector 138, which uses optical means to develop a motion signal indicating the movement of probe tip 130. This optical means may, for example, use heterodyne interferometry to indicate changes in an optical path length extending downward to a reflective surface 139 moving with the probe tip 130. Alternately, the position at which an obliquely incident laser beam, reflected off the reflective surface 139 strikes an array of photodetective elements within the laser detector 138, can be used to determine changes in the probe position. In either case, the output signal from the laser detector 138 is based on the component of movement, in the Z-axis direction of arrow 124, of the reflective surface 139 moving with the probe tip 130. The output of the laser detector 138 is driven through a band-pass filter 140 allowing the transmission therethrough of an output signal including frequencies in the range of the driving signal from excitation driver 128 while preventing the transmission of frequencies far from this range.

The output signal from band-pass filter 140 is provided as an input to a demodulator 141, which develops an output signal reflecting the amplitude of the tip motion signal at the excitation frequency of excitation driver 128 from the laser detector 138. The output of the demodulator 141 is provided as an input to a comparison circuit 142, where a comparison is made with a signal from a computing system 144, controlling the measurement process occurring in the apparatus 110, through a digital to analog convertor 146.

During operation of the device, the Z-axis driver 122 is preferably used to maintain the distance between the probe tip 130 and the sample surface 134 within a pre-determined range, causing the probe tip 130 to move upward and downward with changes in the topography of the sample surface 134 as these changes are encountered through lateral relative motion occurring between the sample 135 and the probe tip 130. The comparison circuit 142 generates a correction signal which is a difference between the control signal sent from computing system 144 and through digital to analog convertor 146 and the output from demodulator 141 Thus, the control signal provides a setpoint level determining the vibration amplitude at which the probe tip 130 is operated. The correction signal from comparison circuit 142 is applied as an input to an integrator 148, in which an accumulation of the changes, required by movement of the vibration amplitude from the set point amplitude associated with the set point signal, is developed and stored. At all times during operation of the device, the correction signal, the output of integrator 148 represents the position of the probe tip 130. The output of integrator 148 is thus fed into the controlling computer system 144 through an analog to digital convertor 149 as the digitized Z-AXIS POSITION DATA derived in the measuring process.

In accordance with a preferred version of the present invention, the Z-axis movement of the probe tip 130 driven though Z-axis driver 126 is performed either as a part of a closed-loop analog servo system or under direct control of the computing system 144. For closed-loop analog servo operation, the output of integrator 149 is also applied, through a switch 150 as an input to Z-axis driver 126, to cause movement of the probe tip 130 as required to maintain the output at a level corresponding to the control signal provided as an input to the comparison circuit 142 from the computing system 144. That is, if the amplitude signal from demodulator 144 is too high, the probe tip is lowered, in the direction of arrow 124; if the amplitude signal is too low, the probe tip is raised, opposite the direction of arrow 124. Thus, the Z-axis driver 126 is driven through a servo loop to maintain a constant level of engagement between the vibrating probe 130 and the sample surface 134, while the Z-position data from analog to digital convertor 149 provides the computing system 144 with an accurate description of the level of sample surface 124.

The computing system 144 includes a memory 151, which may include random access memory circuits as well as a hard disk, for storing programs to be executed and for storing the data obtained as a result of the execution of such programs. A display device 152 provides a visual indication of this data. Programs may be entered through machine readable media 153, such as magnetic disks. The computing system 144 drives the Z-axis driver 126 directly through a digital-to-analog convertor 154, which opens the electronic switch 150 while applying a voltage signal to the driver circuit 126.

Figure 8:
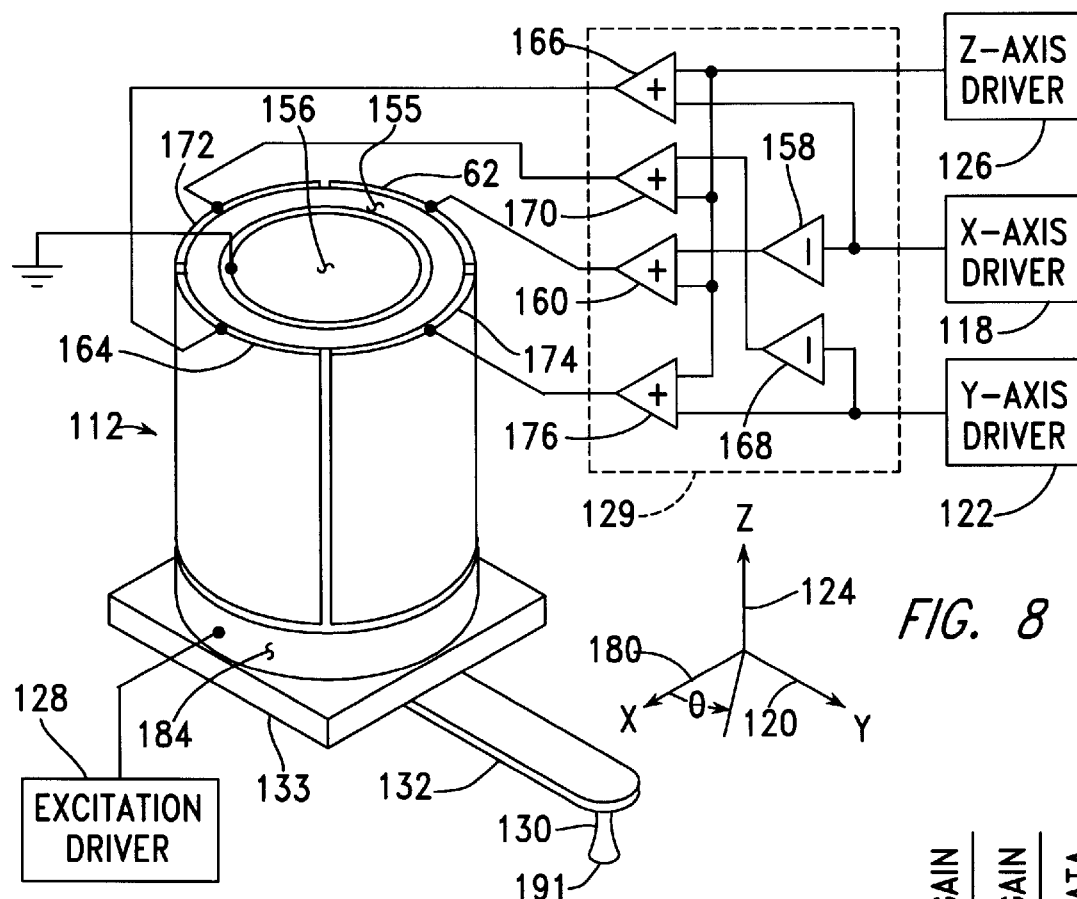
FIG. 8 is an isometric view of a probe used in the scanning force microscope of FIG. 7, together with a cantilever and a piezoelectric actuator used to move the probe in three directions orthoganal to one another.

FIG. 8 is a partly schematic isometric view of piezoelectric actuator 112 and associated drive circuits. The piezoelectric actuator 112 includes a hollow cylinder 155 composed of piezoelectric material, with electrodes extending along various surfaces for the application of voltages to cause the deflection of the cylinder 155 in various manners. An electrical ground potential is applied to an inner electrode 156 extending along the inner surface of the hollow cylinder 155.

In general, applying a positive voltage to an electrode extending partially around the outer surface of the hollow cylinder 155 causes the portion of the cylinder adjacent to the electrode to compress, while applying a negative voltage to such an electrode causes this portion of the cylinder to expand. In the present application, it is particularly desirable to be able to move the probe 130 in either scanning direction, X or Y, without causing corresponding movement in the Z direction Therefore, movement in the X- or Y- direction is established by applying a predetermined voltage at opposite polarities to opposite sides of the piezoelectric actuator 112. To obtain an opposite polarity of the X-axis driving signal, the output of the X-axis driver 118 is fed through an inverting amplifier 158, with the output of this amplifier 158 being applied as an input to a summing amplifier 160. The output of this amplifier 160 is applied to a −X electrode 162. The output of the X-axis driver 118 is also fed to a +X electrode 164, located diametrically opposite the −X electrode 162, through a summing amplifier 166. Similarly, to obtain an opposite polarity of the Y-axis driving signal, the output of the Y-axis driver 122 is fed through an inverting amplifier 168, with the output of this amplifier 168 being applied as an input to a summing amplifier 170. The output of this amplifier 170 is applied to a −Y electrode 172. The output of the Y-axis driver 122 is also fed to a +Y electrode 174, located diametrically opposite the −Y electrode 172, through a summing amplifier 176.

Continuing to refer to FIG. 8, and referring again to FIG. 7, when a positive voltage is provided as an output of the X-axis driver 118, the probe 130 is deflected in the X-direction of arrow 180, with the distance of this deflection being essentially proportional to the positive voltage. On the other hand, when a negative voltage is provided as an output of the X-axis driver 118, the probe 130 is deflected opposite the X-direction of arrow 120, with the distance of this deflection being essentially proportional to the negative voltage. Similarly, when a positive voltage is provided as an output of the Y-axis driver 122, the probe 130 is deflected in the Y-direction of arrow 120, with the distance of this deflection being essentially proportional to the positive voltage; and, when a negative voltage is provided as an output of the Y-axis driver 122, the probe 130 is deflected opposite the Y-direction of arrow 120, with the distance of this deflection being essentially proportional to the negative voltage.

When a positive voltage is simultaneously applied to all of the X and Y electrodes 162, 164, 172, 174, the hollow cylinder 155 of piezoelectric material is axially compressed, so that the probe 130 is raised in the Z-direction of arrow 124. When a negative voltage is simultaneously applied to these electrodes 162, 164, 172, 174, the hollow cylinder 155 is axially expanded, so that the probe 130 is lowered opposite the Z-direction of arrow 124. Thus, the output signal from Z-axis driver 126 is simultaneously applied to all these electrodes 162, 164, 172, 174 through summing amplifiers 160, 166, 170, 176.

An oscillating voltage drive signal is also applied to an excitation electrode 184, extending in an annular pattern around a portion of the hollow cylinder 155, causing the probe 130 to be vibrated in the Z-direction of arrow 124.

In accordance with a first version of the present invention, the capability of the piezoelectric actuator to move the tip 130 in X- and Y-directions is used to provide certain limited, generally repetitive movements optimizing the process of detecting a wall 185 extending along the sample surface 134 and the process of examining the profile of such a wall. Movement of the sample 135 is used to establish relative motion between the sample surface 136 and the vibrating probe 130, so that the probe 130 traverses the sample surface 136, allowing the required data to be generated for the surface.

Digital scanning motion data is fed from the computing system 144 to a digital to analog convertor 186, where some of the data (i.e. certain bits of the data) is used to generate movement in the X-direction, while a remaining portion of the data is used to generate movement in the Y-direction. Analog signals for movement in the X- and Y-directions are fed into a scanning motion driver 188, which in turn operates a scanning motion actuator 190, in which piezoelectric elements, for example, are used to generate movement of the sample 135.

In accordance with a second version of the present invention, the movements in the X- and Y-directions, which are available through the use of the piezoelectric actuator 112, are used both for the repetitive movements used to optimize the detection of a wall 185 extending along the sample surface 134 and for the much longer scanning movements used to traverse the sample surface 134. In this version, the scanning motion actuator 190 and associated elements 186, 188 may be eliminated, with the X-AXIS MOTION DATA and Y-AXIS MOTION DATA supplied as inputs to digital-to-analog convertors 178, 182, respectively, having been generated within the computing system 144 to include the motion data causing the probe 130 to traverse the sample surface 134 as desired.

The probe 130 preferably includes a ring-shaped contact surface 191, extending radially outward from the longitudinal axis of the probe 130, so that the contact surface 191 contacts a wall 185 regardless of the angle at which the wall 185 extends along the sample surface 134.

In general, the probe 130 can be caused to traverse the sample surface 134 in any scanning direction along a plane perpendicular to the Z-axis of arrow 124. This direction is indicated by an angle θ with respect to the X-axis, as shown in FIG. 8. In a linear scanning mode of operation, a dithering vibration is added to the probe motion, to occur as well in the scanning direction of angle θ. Thus, the drive signals necessary to cause the dithering motion are given by:

$$V_{DX} = A \cos \theta \sin (\omega t) \qquad 1)$$

$$V_{DY} = A \sin \theta \sin (\omega t) \qquad 2)$$

In the above equations, $V_{DX}$ is the voltage signal applied to X-axis driver 118 to cause dithering vibration, $V_{DY}$ is the voltage signal applied to Y-axis driver 122 to cause dithering vibration, and A is a constant determining the amplitude of dithering vibration. The constant ω is the angular frequency of the dithering vibration, and the variable t is the time variable.

The dithering motion obtained in this way is combined with a scanning motion also occurring in the direction of angle θ. The drive signals necessary to obtain this scanning motion are given by:

$$V_{SX} = S \cos \theta \qquad 3)$$

$$V_{SY} = S \sin \theta \quad 4)$$

In the above equations, S is a constant provided to maintain a constant scanning velocity.

In the exemplary apparatus of FIG. 7, a voltage signal at the dithering frequency is provided as an output of an oscillator 191. The drive signal for dithering motion in the X-direction, $X_{DX}$, is derived by applying this output from oscillator 191 through a switch 193a as an input to an amplifier 192, which has a gain variable in response to a signal from a digital-to-analog convertor 193. Similarly, the drive signal for dithering motion in the Y-direction, $V_{DY}$, is derived by applying the output from oscillator 191 as an input into an amplifier 194, which has a gain variable in response to a signal from a digital-to-analog convertor 195. In this way, the computing system 144 controls the amplitude of the signals providing dithering motion in both the X- and Y-directions in accordance with the equations given above for $V_{DX}$ and $V_{DY}$. Also in the apparatus of FIG. 7, the SCANNING MOTION DATA is derived in such a way that the scanning motion drive signals, $V_{SX}$, and $V_{SY}$ are applied to the scanning motion driver 188 from the digital-to-analog convertor 186.

Figure 9:
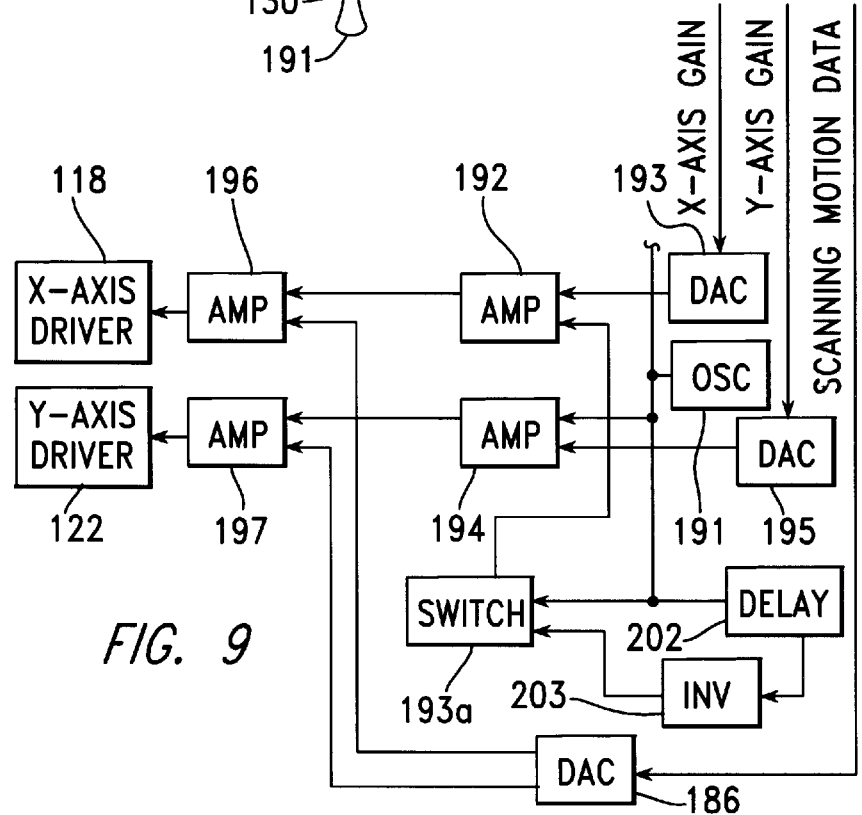
FIG. 9 is a block diagram of alternative drive circuits used to provide relative motion between the probe tip and sample surface of the scanning force microscope of FIG. 7 without moving the sample surface.

FIG. 9 is a schematic view of alternate circuits providing scanning movement in an scanning probe microscope otherwise similar to the microscope of FIG. 7. In the apparatus of FIG. 9, the oscillator 191, amplifiers 192, 194 and digital-to-analog convertors 193, 195 operate as described above in reference to FIG. 7. A pair of summing amplifiers 196, 197 is added, with inputs from the amplifiers 192, 194, respectively, and from the digital-to-analog convertor 186. In this way, the dithering vibration signals, $V_{DX}$ and $V_{DY}$ are respectively added to the corresponding scanning signals, $V_{SX}$ and $V_{SY}$ to derive the input signals to X-axis driver 118 and 122. In this configuration, scanning motion actuator 190 and scanning motion driver 188 of the configuration of FIG. 7 are eliminated, with the sample 135 remaining clamped in a fixed position through the scanning process.

Figure 1:
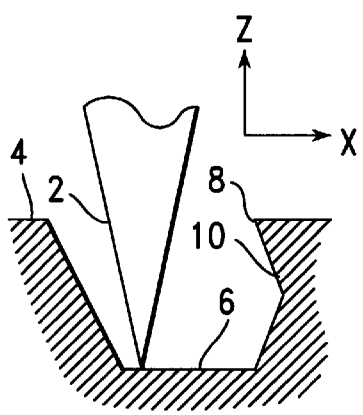
FIG. 1 is a fragmentary transverse cross-section of a trench within a sample surface, together with a conventional probe tip of a scanning probe microscope.
Figure 2:
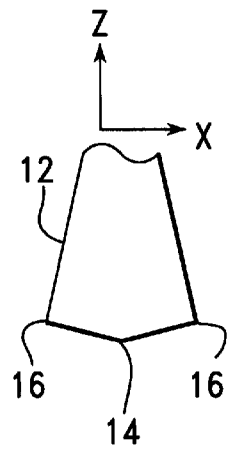
FIG. 2 is a fragmentary side elevation of a first type of probe tip for a scanning probe microscope described in the prior art.
Figure 3:
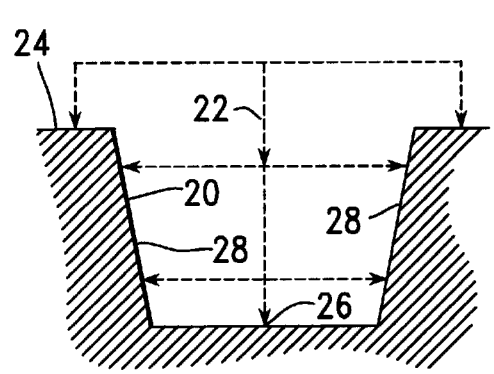
FIG. 3 is a transverse cross-sectional view of a trench within a sample surface, together with dashed lines indicating sequential movement of the probe tip of FIG. 2, as described in the prior art; to examine the trench.
Figure 4:
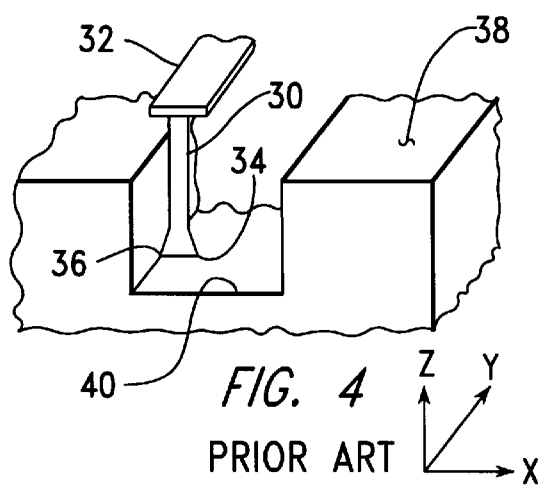
FIG. 4 is a fragmentary pictorial view of a second type of probe tip for a scanning probe microscope described in the prior art, within a trench in a sample surface.
Figure 5:
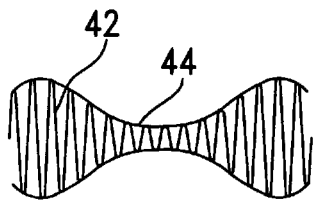
FIG. 5 is a graphical view of an output signal describing vibration of the probe tip of FIG. 4 as described in the prior art.

Referring again to FIGS. 5 and 7, when the probe tip 130 is being driven with the voltage signals described in the above equations 1) through 4), producing both dithering vibration and scanning movement in the direction of angle θ, the output of laser detector 138 is as described above in reference to FIG. 5, and as explained more thoroughly in U.S. Pat. No. 5,283,442, being composed of a signal 42 vibrating at the excitation signal of oscillator 136 within the limits of an envelope 44 occurring at the significantly lower frequency of oscillator 195. Thus, the output signal of laser detector 138 is applied as an input to a low-pass filter 196, which transmits frequencies in the range of the envelope 44 (i.e., in the dithering frequency range of the oscillator 191) to a demodulator 197. The output of this demodulator 197 is provided as an input to the computing system 144 through an analog-to-digital convertor 198.

The output of the demodulator 197 provides an indication of the local slope of the surface being traversed by the probe tip 130. If the local sample surface is flat and level as it extends in the direction of angle θ, then the envelope is of a constant size, and the output of the demodulator 197 has a zero value. While the absolute value of the output of the low pass filter 196 increases with increases in the steepness of the slope in the direction of angle θ, it is not possible to determine whether the slope is upward or downward by merely examining the envelope curve 44, or the output of low-pass filter 196. Instead, this determination is made by comparing the output of the low-pass filter 196 with the driving signal from oscillator 191, which is also supplied as an input to the demodulator 197. If the slope is downward, increases in the distance through which the probe moves in the direction of angle θ result in an increased gap between the probe tip 130 and the sample surface 134. Thus, in the presence of a downward slope, the output of low-pass filter 196 varies in phase with the driving signal from oscillator 191. On the other hand, if the slope is upward, increases in the scanning distance through which the probe moves in the direction of angle θ result in a decreased gap between the probe tip 130 and the sample surface 134. Thus in the presence of an upward slope, the output of low-pass filter 198 varies out of phase with the driving signal from oscillator 191. The information obtained by making this comparison within demodulator 197 is stored by setting or resetting a single bit in the analog-to-digital convertor 198.

In accordance with a preferred version of the present invention, the microscope apparatus 110 is operated in an analog mode, with the voltage signal to Z-axis driver 126 being determined by the output of integrator 148, driven through a closed switch 150, whenever the upward or downward slope, indicated by the output of demodulator 197 is below a first threshold level. When this level is exceeded, the microscope 110 is operated in an incremental mode, with switch 150 being opened, so that the Z-axis driver 126 is operated by the computing system 144 in an with Z-AXIS DRIVE DATA through digital-to-analog convertor 154. During operation in the incremental mode, the demodulator 197 continues to report values indicating the level of the local slope. When this level, whether the slope is upward or downward, falls below a second threshold value, the apparatus 110 returns to operation in the analog mode.

Figure 6:
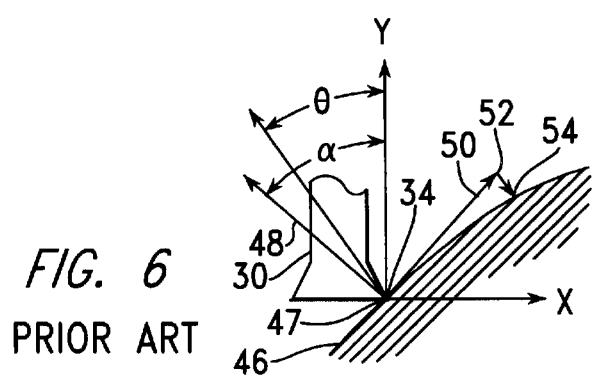
FIG. 6 is a pictorial view of incremental movement of the probe of FIG. 4 to follow a curved surface as described in the prior art.

In the incremental mode, the movement of the probe tip 130 occurs generally as described above in reference to FIG. 6, and as described more thoroughly in U.S. Pat. No. 5,283,442, with the exception that, in the present invention, scanning movement occurs along a plane in the direction of angle θ. That is, scanning occurs in general in both X- and Y- directions, being driven by numerical information supplied to the digital-to-analog convertor 186 from the computing system 144.

Apparatus built according to the present invention has the advantage over the prior art of allowing the directions of scanning and of dithering vibration to be adjusted together but independently from the manner in which the sample 135 is mounted. This adjustment is made by varying the angle θ in response to a keyboard entry. Many sample surfaces 134, such as diffraction gratings, laser disks, and even printed circuits having a number of parallel lines, have features dictating a preferred direction of scanning. These features may not be in alignment with surfaces used to determine the angle at which the sample 135 is clamped for examination. With the apparatus of the present invention, this feature can be used to establish a direction of scanning after the sample is clamped in place, and even for varying this angle as required during the scanning process. On the other hand, the scanning force microscopes of the prior art develop parallel scan lines each extending in only one direction, such as the X-axis direction.

The previous discussion has described the preferred use of apparatus built according to the present invention in applications in which the angle to various wall surfaces to be examined is known. That is, the previous discussion has described the use of the apparatus in applications in which the angle θ for scanning and dithering is known or easily determined. Apparatus built in accordance with the present invention preferably also can be operated to determine the direction at which a wall of the sample surface 134 lies in the X-Y plane. Such operation is achieved by dithering the probe in a pattern including movement away from the line along which the probe is scanned.

Figure 10:
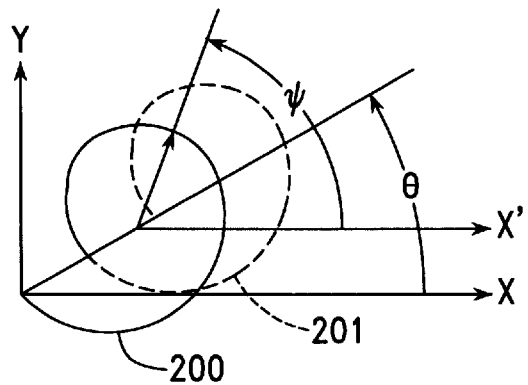
FIG. 10 is a pictorial plan view of a spiral pattern in which the probe of FIG. 1 is moved relative to the sample surface within the microscope of FIG. 7.

FIG. 10 is a pictorial plan view of a dithering pattern which is particularly useful in determining the direction in which a wall of the sample surface lies in the X-Y plane. This spiral pattern 200 is formed by a combination of a dithering pattern which is a circular pattern in which the probe tip 130 is moved in a circle having a radius R at an angular velocity ω. Thus, the drive signals necessary to cause the dithering motion are given by:

$$V_{DX} = B\cos(\omega t) = -B\sin\left(\omega t - \frac{\pi}{2}\right) \quad 5)$$

$$V_{DY} = B\sin(\omega t) \quad 6)$$

In the above equations, B is a constant determining the radius of the circular dithering motion. The drive signals necessary to obtain the scanning motion given by the equations 3) and 4), which have been discussed above.

At any time, the point to which the probe 130 has been driven is also characterized by an angle ψ, which is an angle of rotation from the axis X' forming the instant center of the circular motion and extending in the X-direction. This angle is given by:

$$\psi = \omega t = \arctan\left(\frac{V_{DY}}{V_{DX}}\right) \quad 7)$$

In FIG. 10, the relative probe motion resulting from a single circular dithering motion is shown with a solid line 200, while the motion resulting from another circular dithering motion is shown with a dashed line 201. These patterns are repeated as often as necessary to traverse the sample.

Referring again to FIGS. 7 and 9, the circular motion resulting from the voltages described in equations 5) and 6) is readily obtained by applying the sinusoidal output voltage from oscillator 191 as an input to the Y-axis driver 122 and also as an input to a delay circuit 202. This delay circuit 202 delays the transmission of its output signal to the X-axis driver 192 by the time required to rotate the probe 130 through a quarter of a circle (i.e. through an angle of π/2) in the circular dithering pattern 200. The output of the delay circuit 202 is inverted, with positive levels being converted to negative levels, etc., within an invertor 203, which provides an input to the switch 193a.

Figure 11:
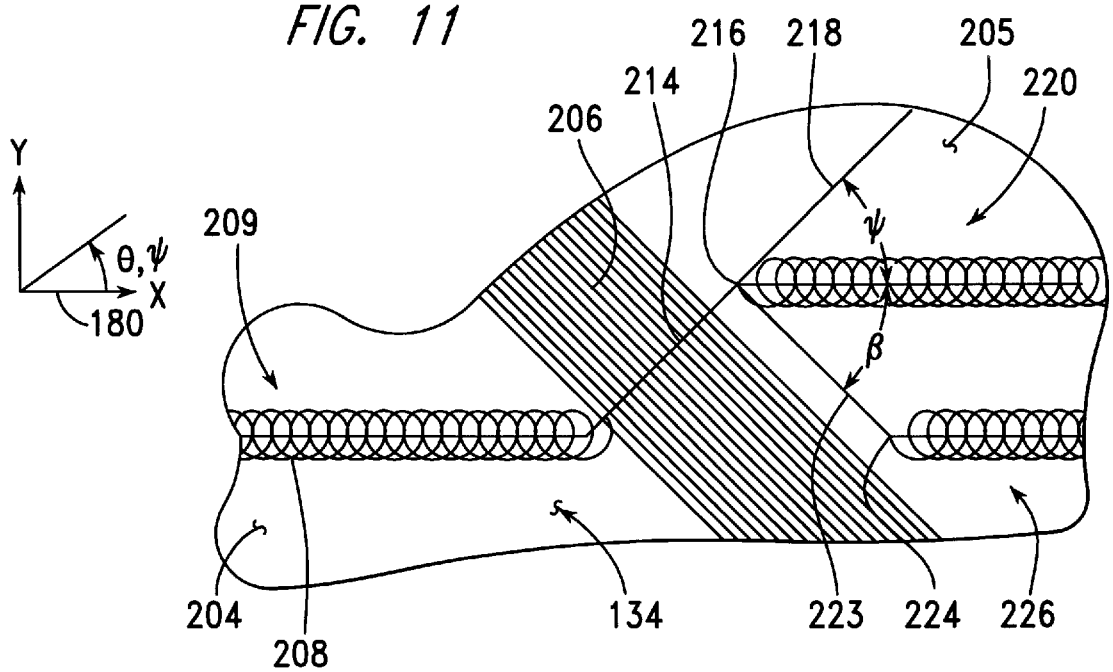
FIG. 11 is a pictorial plan view of several alternative patterns of relative motion between the probe and the sample surface within the microscope of FIG. 7, used as a sloping wall of the sample surface is traversed.

FIG. 11 is a fragmentary plan view of the sample surface 134, including essentially flat plateau surfaces 204, 205, and a sloped wall 206, indicated by a number of parallel lines. The relative movement between the probe 130 (shown in FIG. 8) and the sample surface 134 is shown by a number of lines 209, having a pattern which varies with encountering the sloped wall 206 and in accordance to three versions of the present invention. This relative movement is either a combination of the movement of the probe tip 130 and the sample 135, using the apparatus of FIG. 7, or the movement of the probe tip 130 across a stationary sample, using the apparatus of FIG. 9.

On the first plateau surface 204, relative motion between the probe 130 (shown in FIG. 8) and the sample surface 134 occurs in the form of a number of spiral patterns 200, which are connected into a pattern 209 to provide a general scanning movement, in the example of FIG. 11, in the X-direction of arrow 180 along the first plateau 204. Movement of the vertically-vibrating probe through spiral dithering patterns 200 in the X and Y horizontal scanning directions constitutes an improved method for acquiring data concerning wall structures 206 extending along the sample surface 134. In many applications, the direction in which the wall 206 extends along the plateau surface 204 is not known. This angle β is therefore part of the information which is needed to be known to describe the test surface 134. Furthermore, if the probe 130 is allowed to continue on a straight course while this angle is not determined, the unknown angle between the direction of probe movement and the angle at which the wall extends along the plateau makes in difficult or impossible to determine the profile of the wall from the data generated within the scanning probe microscope 110 (shown in FIG. 7) concerning the vertical movement of the probe 130 as the surface 134 is traversed.

Continuing to refer to FIG. 11, and referring additionally to FIGS. 7 and 10, the first plateau 204 is preferably traversed with the probe 130 moving, relative to the surface 134, in a number of connected spiral patterns 200, with the computing system 144 monitoring the slope of the surface 134 as represented by the output of demodulator 197. When the probe 130 encounters the wall 206 a predetermined threshold level for this measured slope, upward or downward, is first exceeded, as the probe 130 is driven to an angle ψ from the X-axis, which is perpendicular to the angle β at which the wall 206 extends across the X-axis. This angular relationship is true whether the probe 130 is approaching an upward sloping wall with a forward portion (in the direction of scan) of the contact ring 191 moving along an upward sloping part of the sample surface 135, or whether the probe 130 is approaching a downward sloping wall with a rearward portion (opposite the direction of scan) of the contact ring 191 moving along a downward sloping part of the sample surface 135. Therefore, after the threshold value for surface slope has been exceeded, the motion of the probe 130 is continued along a line 214 at this angle, straight up or down the sloped wall 206. This angle ψ is determined to be the angle, at which the probe tip lies in its circular dithering motion, corresponding to the point on sample surface 134 having the maximum slope, upward or downward, encountered during the circular dithering motion.

In accordance with a preferred version of the present invention, the probe 130 is moved up or down the wall 206 with linear probe dithering also occurring along the new scan angle ψ. To determine the shape of the wall 206 in an accurate manner, the method previously discussed in reference to FIG. 6 and discussed more thoroughly in U.S. Pat. No. 5,283,442, is preferably employed during probe movement up or down the wall 206, with an important difference residing in the fact that scanning movements are resolved into components in the X- and Y-directions to determine the driving signals sent to the X-axis driver 118 and the Y-axis driver 122, so that motion occurs in the direction of the angle ψ. The slope of the surface is monitored during motion the probe 130 along this line 214. At a point 216, when the slope, upward or downward, reaches a level below a second predetermined threshold, a determination is made by the computing system 144 that the probe 130 has reached the end of the wall surface 204.

From this point 216, the direction of continued movement of the probe 130 relative to the sample surface 134 is determined in accordance with a predetermined operating mode of the system. When the system is operating in a first mode, relative movement of the probe 130 continues along line 218 at the angle ψ. This operating mode is particularly useful when the sample surface 134 is known to have a number of walls 206 extending parallel to one another, so that determining the angle of one wall effectively determines the angle of all walls.

On the other hand, if the sample surface 134 is known to have a number of walls extending at different angles, or if such information about the sample surface is not known, the system is placed in an operating mode in which the wall angle acquiring spiral dithering patterns 200 are begun again from point 216. When the system is operating in a second mode, relative movement begins along a line 220 of spiral patterns 200. This line 220 extends along the second plateau 205 in the same direction as the pattern 209 of spiral patterns 200 along plateau 204.

One problem with the movement indicated along pattern line 220 arises from the fact that the new line 220 of spiral patterns 200 is displaced, in a direction perpendicular to the direction of scanning (the X-direction in the example of FIG. 11, from the pattern 209 of spiral patterns 200 extending along the first plateau 200. Such displacements are cumulative as the sample surface 134 is traversed with the probe 130, possibly disrupting the pre-determined pattern chosen for traversing the surface 134 to such an extent that the entire surface 134 is not traversed. When the system is operating in the third mode, this problem is solved by causing the probe 130 to move along a line 223 perpendicular to line 214 until it has returned into alignment with the previous pattern 209 of spiral patterns. From the point 224 at which this alignment occurs, relative motion of the probe 130 is established in a new pattern 226 of spiral patterns 200.

Figure 12:
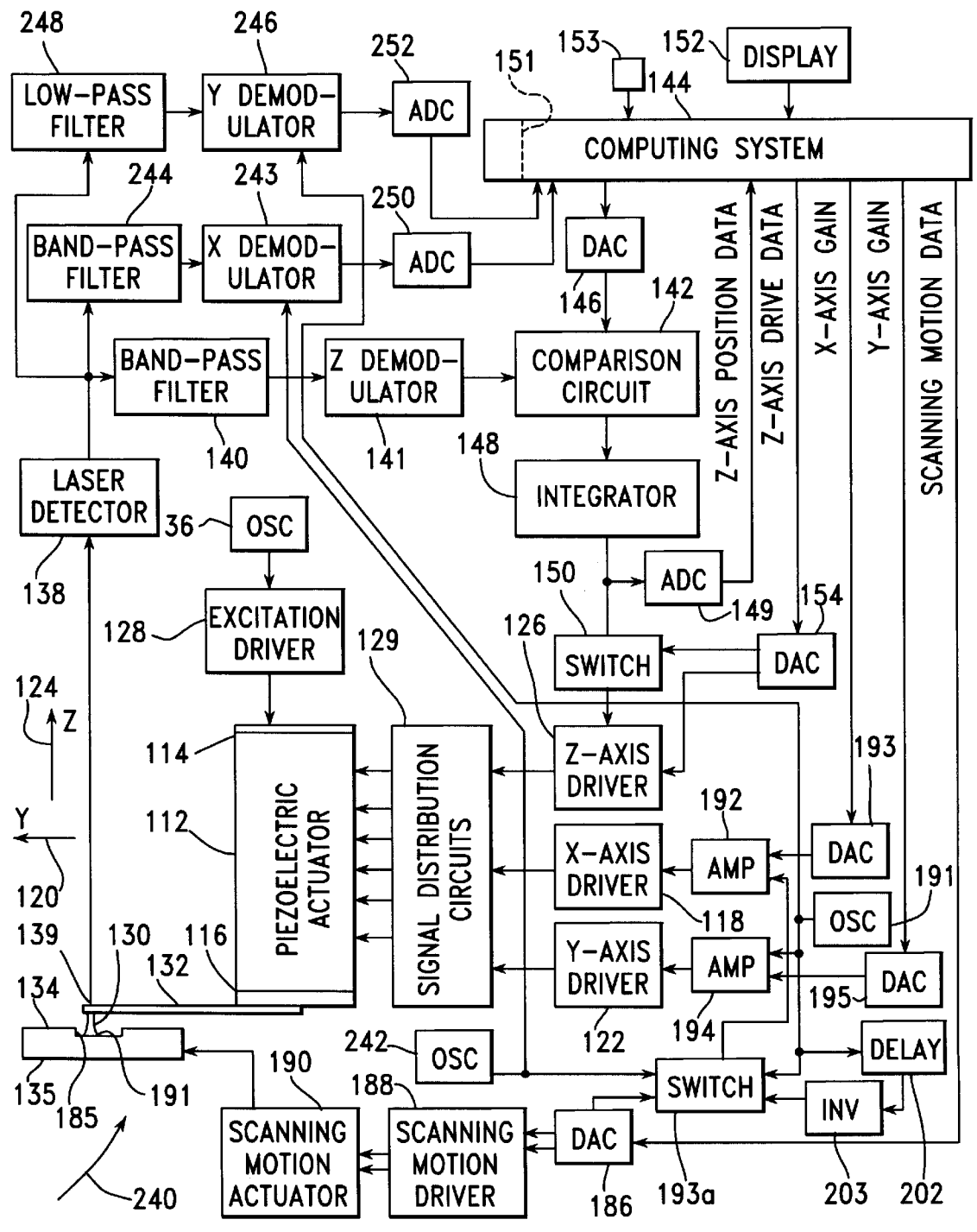
FIG. 12 is a partly schematic side elevation of a scanning force microscope built in accordance with a second embodiment of the present invention.

FIG. 12 is is a partly schematic side elevation of a scanning force microscope 240, built in accordance with a second embodiment of the present invention. This apparatus is configured to apply, to the probe tip 130, vibration in the Z-direction at an excitation frequency derived from an excitation oscillator 36, vibration in the X-direction at an X-axis dithering frequency derived from an X-axis dithering oscillator 242, and vibration in the Y-direction at an excitation frequency derived from a Y-axis oscillator 191. Both the dithering vibration frequencies in the X- and Y-directions are significantly lower than the excitation vibration frequency in the Z-direction, and the dithering vibration frequencies in the X- and Y-directions are sufficiently separated from one another to allow the separate detection of their effects on actual vibration in the Z-direction.

Many of the elements in the alternative scanning force microscope 240 are similar to or identical with corresponding components in the scanning force microscope 110, shown in FIG. 7, and are therefore accorded the same reference numerals.

In the microscope 240, the output of laser detector 138 is provided as an input to a Z demodulator 141 through a band-pass filter 140, as an input to an X demodulator 243 through a band-pass filter 244, and as an input to a Y demodulator 246 through a low-pass filter 248. The band-pass filter 140 passes vibration frequencies in the range of the excitation oscillator 36; the band-pass filter 244 passes vibration frequencies in the range of the X-axis dithering oscillator 242; and the low-pass filter 248 passes vibration frequencies in the range of the Y-axis dithering oscillator 191. In this example, the Y-axis dithering frequency is the lowest of the three frequencies of vibration. The outputs of X demodulator 243 and Y demodulator 246 are provided as inputs to computing system 144 through analog-to-digital convertors 250 and 252, respectively.

The driving signals from X-axis dithering oscillator 242 and Y-axis dithering oscillator 191 are also provided as inputs to the X demodulator 243 and to the Y demodulator 246, respectively. The X demodulator 243 compares the signal corresponding to the variation, in the amplitude of tip vibration in the Z-direction, occurring at the frequency of dithering vibration in the X-direction, with the signal from the X-axis dithering oscillator 242, which causes this dithering vibration. If these signals are in phase (with a phase angle of zero degrees), a sample surface 134 sloping upward in the X-direction is indicated, and a corresponding bit in the analog-to-digital convertor 250 is set. If these signals are out of phase (with a phase angle of 180 degrees) a sample surface 134 sloping downward in the X-direction is indicated, and the corresponding bit in the analog-to-digital convertor is reset. Similarly, The X demodulator 243 compares the signal corresponding to the variation, in the amplitude of tip vibration in the Z-direction, occurring at the frequency of dithering vibration in the X-direction, with the signal from the X-axis dithering oscillator 242, which causes this dithering vibration. If these signals are in phase (with a phase angle of zero degrees), a sample surface 134 sloping upward in the X-direction is indicated, and a corresponding bit in the analog-to-digital convertor 250 is set. If these signals are out of phase (with a phase angle of 180 degrees) a sample surface 134 sloping downward in the X-direction is indicated, and the corresponding bit in the analog-to-digital convertor is reset.

Figure 13:
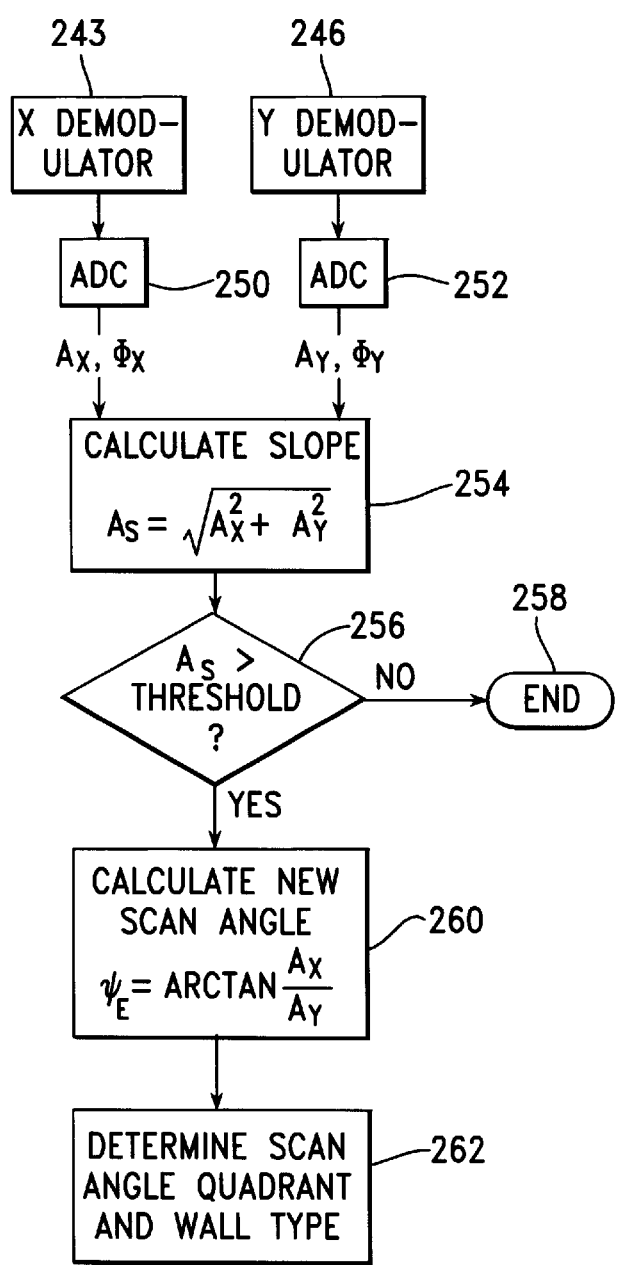
FIG. 13 is a block diagram showing calculations executed within the microscope of FIG. 12 to determine actual conditions of the local slope of the sample surface.

FIG. 13 is a block diagram showing calculations executed within computing system 144 (shown in FIG. 12) to determine actual slope conditions from the data sent through analog-to-digital convertors 250, 252.

Referring to FIGS. 12 and 13, the data from convertor 250 provides $A_X$, the amplitude of the slope in the X-direction, taken from the component of vibration variation occurring at the frequency of the X-axis dithering oscillator 242, and $\phi_X$, the phase angle between this vibration variation and the driving signal from the oscillator 242. Similarly, the data from analog-to-digital convertor 252 provides $A_Y$, the amplitude of the slope in the Y-direction, taken from the component of vibration variation occurring at the frequency of the Y-axis dithering oscillator 191, and $\phi_Y$, the phase angle between this vibration variation and the driving signal from the oscillator 191. In block 254, an actual slope amplitude, $A_S$, is calculated as:

$$A_S = \sqrt{A_X^2 + A_Y^2} \qquad 8)$$

At this point, a determination has not been made concerning whether this actual slope is upward or downward. In block 256, a determination is made of whether the actual slope exceeds a threshold level which has been determined to indicate the beginning of an upward- or downward-sloped wall in the sample surface 134. If the actual slope is less than this threshold value, this calculation subroutine is exited in block 258.

If the actual slope is greater than the threshold value, a new scanning direction, straight up or down the detected wall surface, is determined in blocks 260, 262. This new scanning angle ψ is the angle having the maximum slope, upward or downward, encountered within the dithering pattern when the threshold value is exceeded. First, in block 260, a first quadrant equivalent angle is calculated as:

$$\psi_E = \arctan\left(\frac{A_X}{A_Y}\right) \qquad 9)$$

At this point, it is not known in which of the four quadrants of circle the next scan angle, ψ, should be placed, so the equivalent angle, $\psi_E$, is considered to be in the first quadrant, between zero and ninety degrees.

Figure 14:
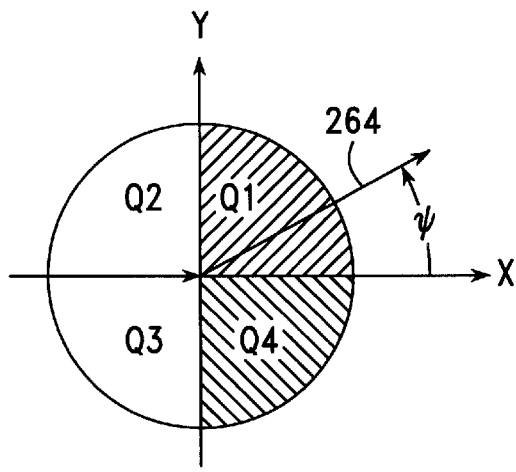
FIG. 14 is a plan view forming a pictorial representation of a change in scan direction, within the apparatus of FIG. 12, from the X-direction to a new direction after encountering a sloped wall of the sample surface.

FIG. 14 is a plan view forming a pictorial representation of a change in scan direction from the X-direction to a new direction 264 at a new scan angle, ψ, L measured with respect to the X-direction, after a wall surface extending in the X-Y plane perpendicular to the scan angle direction, ψ, is encountered. Since the relative motion is in the X-direction before the wall surface is encountered, the new scan angle ψ must be in the cross-hatched areas of either the first quadrant Q1 or in the fourth quadrant Q4. These quadrants include all of the angles within ±90 degrees of the initial scanning direction.

Figure 15:
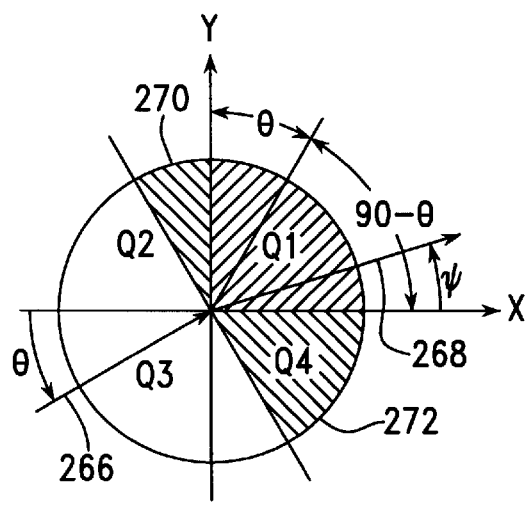
FIG. 15 is a plan view similar to FIG. 14, except that the initial scan direction is between the X- and Y-directions.

FIG. 15 is a plan view forming a pictorial representation of a change in scan direction from a direction 266 at an angle θ, measured with respect to the X-axis, to a new direction 268, at a new scan angle ψ, within the first quadrant Q1, also measured with respect to the X-axis, again after a wall surface extending in the X-Y plane perpendicular to the scan angle direction, ψ, is encountered. Again, since the probe tip has been moving forward in the original scan direction, θ, the new scan direction, ψ, must lie at an angle within ±90 degrees of this angle θ. Thus, the new scan direction, ψ, must lie in the first quadrant Q1, in an adjacent portion 270, indicated by cross-hatching, of the second quadrant Q2, or in an adjacent portion 272, also indicated by cross-hatching, of the fourth quadrant Q4.

Figure 16:
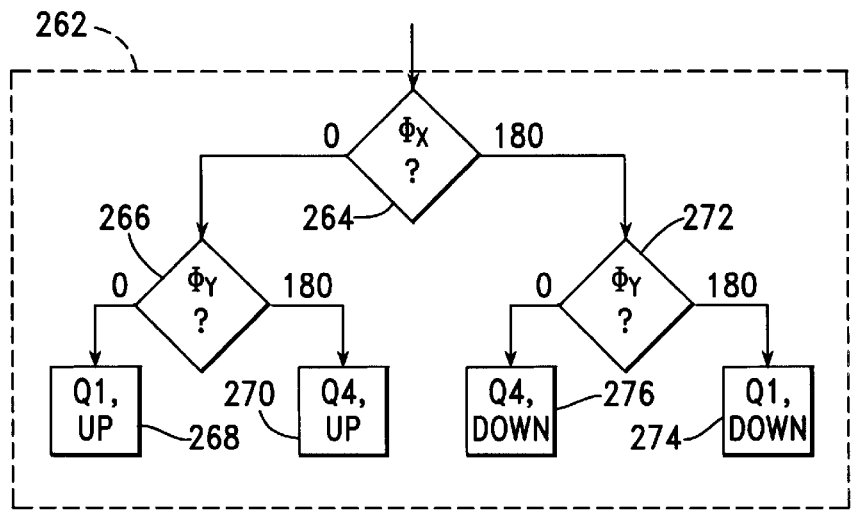
FIG. 16 is a flow diagram of a subroutine executing within a processor in the microscope of FIG. 12 to determine the new scan angle in the situation shown in FIG. 14.

FIG. 16 is a flow diagram of a subroutine 262 executing in the processor 114 of scanning force microscope 240 (shown in FIG. 12) to determine a new scan direction ψ after a wall surface is encountered under the conditions of FIG. 14 (i.e. after scanning in the X-direction).

Referring to FIGS. 12–14 and 16, first, in block 264 of FIG. 16, a determination is made of upward or downward direction of the X-component of the modulation of the output of laser detector 139, by examining the $\Phi_X$ phase angle from analog-to-digital convertor 250. If this phase angle is essentially 0, an upward slope in the X-direction is indicated; if this phase angle is essentially 180 degrees, a downward slope in the X-direction is indicated. If the phase angle $\Phi_X$ is determined to be zero in block 264, a determination is made in block 266 of the Y-component of modulation of the output of laser detector 139. If this phase angle is essentially 0, an upward slope in the Y-direction is indicated; if this phase angle is essentially 180 degrees, a downward slope in the Y-direction is indicated.

The actual scan angle ψ, at which the wall is to be traversed straight upward or downward, must be in an orientation in which both the X- and Y-components of modulation indicate an upward slope, or in which both of these components indicate a downward slope. Because of the initial scanning in the X-direction, the new scan angle ψ must in the first quadrant Q1 or in the fourth quadrant Q4. Thus, while this angle ψ must lie in a positive X-direction, it may also lie in either a positive or negative Y-direction. An downward slope in the Y-direction is an upward slope in the −Y direction, and an upward slope in the Y-direction is a downward slope in the −Y direction. Thus, if $\Phi_X$ and $\Phi_Y$ are both determined to be 0 in blocks 264 and 266, respectively, with both X- and Y-components indicating upward slopes, the angle ψ must extend within the first quadrant Q1, indicating the beginning of an upward sloping wall as shown in block 268. If it is determined in block 266 that $\Phi_Y$ is 180 degrees, indicating a downward slope in the Y-direction, and hence an upward slope in the −Y direction, the angle must be in the fourth quadrant Q4, indicating the beginning of an upward sloping wall as shown in block 270.

On the other hand, if $\Phi_X$ and $\Phi_Y$ are both determined to be 180 degrees in blocks 264 and 272, respectively, with both X- and Y-components indicating downward slopes, the angle ψ must extend within the first quadrant Q1, indicating the beginning of an downward sloping wall as shown in block 274. If it is determined in block 266 that $\Phi_Y$ is 0 degrees, indicating an upward slope in the Y-direction, and hence an downward slope in the −Y direction, the angle ψ must be in the fourth quadrant Q4, indicating the beginning of an downward sloping wall as shown in block 276.

Figure 17:
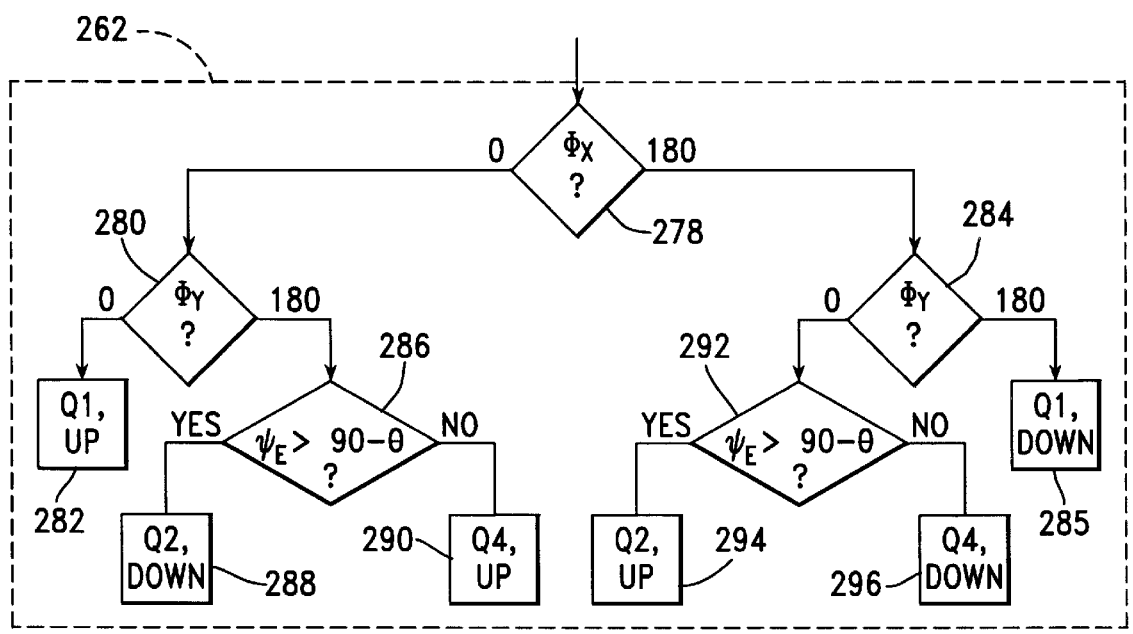
FIG. 17 is a flow diagram of a subroutine executing within a processor in the microscope of FIG. 12 to determine the new scan angle in the situation shown in FIG. 15.

FIG. 17 is a flow diagram of the subroutine 262 executing in the processor 114 of scanning force microscope 240 (shown in FIG. 12) to determine a new scan direction ψ after a wall surface is encountered under the conditions of FIG. 15 (i.e. after scanning in the an angle θ, between 0 and 90 degrees relative to the X-direction.

Continuing to refer to FIGS. 12 and 13, and referring additionally to FIGS. 15 and 17, first, in block 278, of FIG. 17, a determination is made of upward or downward direction of the X-component of the modulation of the output of laser detector 139, by examining the $\Phi_X$ phase angle from analog-to-digital convertor 250. If this phase angle is essentially 0, an upward slope in the X-direction is indicated; if this phase angle is essentially 180 degrees, a downward slope in the X-direction is indicated. If the phase angle $\Phi_X$ is determined to be zero in block 278, a determination is made in block 280 of the Y-component of modulation of the output of laser detector 139. If this phase angle is essentially 0, an upward slope in the Y-direction is indicated, so that the angle ψ must extend in the first quadrant Q1, at the beginning of an upward sloping wall, as indicated in block 282. If both of determined to be 180 degrees in blocks 278, 284, the angle ψ must extend in the first quadrant Q1, at the beginning of a downward sloping wall, as indicated in block 285.

If the above conditions are not met (i.e. if the phase angles $\Phi_X$ and $\Phi_Y$ are of different values), the angle ψ must not be in the first quadrant Q1. To maintain the angle ψ within ±90 degrees of the original scan angle θ, the angle ψ must extend within either the cross-hatched portion 270 of the second quadrant Q2, or within the cross-hatched portion 272 of the fourth quadrant Q4. If the angle ψ lies within the cross-hatched portion 270 of the second quadrant Q2, the first quadrant equivalent angle $\psi_E$ must lie within the first quadrant, being greater than (90−θ). Similarly, if the angle ψ lies within the cross-hatched portion 272 of the fourth quadrant Q2, the first quadrant equivalent angle $\psi_E$ must lie within the first quadrant, being less than (90−θ). These conditions must be met since the angles ψ and $\psi_E$ must have the same tangent, except for its sign (±).

Thus, after a determination is made in block 280 that $\Phi_Y$ is 180 degrees while $\Phi_X$ is 0, a determination is made in block 286 of whether $\psi_E$ is greater than (90−θ). If it is, ψ lies in the cross-hatched area 270 of the second quadrant Q2, at the beginning of a downward sloping wall, as indicated in block 288. If it is not, ψ lies in the cross-hatched area 272 of the fourth quadrant Q4, at the beginning of an upward sloping wall, as indicated in block 290.

Similarly, after a determination is made in block 284 that $\Phi_Y$ is 0 while $\Phi_X$ is 180 degrees, a determination is made in block 292 of whether $\psi_E$ is greater than (90−θ). If it is, ψ lies in the cross-hatched area 270 of the second quadrant Q2, at the beginning of an upward sloping wall, as indicated in block 294. If it is not, ψ lies in the cross-hatched area 272 of the fourth quadrant Q4, at the beginning of a downward sloping wall, as indicated in block 296.

Continuing to refer to FIG. 12, various elements needed to operate the apparatus 110 in the method described above in reference to FIG. 7 are retained in the apparatus 240. It is understood that a single scanning probe microscope may be used to examine a number of different types of surfaces and to provide a number of different types of information about such surfaces. In this regard, it is desirable to maintain several different types of operation among which the operator can choose to fit a particular application.

Thus, the switch 193a is used to choose among operation of the X-axis driver 118 according to the output of the oscillator 191 also driving the Y-axis driver, so that linear dithering is achieved, according to a signal, delayed through delay circuit 202, from this oscillator 19, so that circular dithering is achieved, or according to the output of oscillator 242, so that the X-axis driver 118 and the Y-axis driver 122 are operated at different dithering frequencies.

The apparatus described above in reference to FIGS. 12–17 can be used in the manner described in reference to FIG. 11, with vibration in X- and Y-directions being used in place of the spiral patterns 208, 220, 226.

While the invention has been described in its preferred form or embodiments with some degree of particularity, it is understood that this description has been given only by way of example, and that numerous changes in the details of construction, fabrication and use, including the combination and arrangement of parts, may be made without departing from the spirit and scope of the invention.

What is claimed is:

1. Apparatus for determining topographical features of a sample surface, wherein said apparatus comprises:
   a probe tip including a circular protrusion, extending parallel to said sample surface and movable in engagement with said sample surface;
   a cantilever attaching said probe tip to a probe mounting surface;
   Z-drive means for creating relative motion in a Z-direction, perpendicular to said sample surface, between said probe mounting surface and said sample surface, wherein said relative motion in a Z-direction includes movement to retain a level of engagement between said probe tip and said sample surface and an excitation vibration at an excitation frequency of vibration;
   X-drive means for creating relative motion in an X-direction, parallel to said sample surface, between said probe mounting surface and said sample surface, wherein said relative motion in an X-direction includes a first scanning movement to traverse said sample surface with said probe tip and a first dithering vibration at a first frequency of vibration;
   Y-drive means for creating relative motion in a Y-direction, parallel to said sample surface and perpendicular to said X-direction, between said probe mounting surface and said sample surface, wherein said relative motion in a Y-direction includes a second scanning movement to traverse said sample surface with said probe tip and a second dithering vibration at a second frequency of vibration;
   a detector generating a tip motion output signal in response to vibration of said probe tip in said Z-direction;
   a first demodulator generating, in response to said tip motion output signal, a first feedback signal representing an amplitude of vibration of said probe tip;
   a second demodulator generating, in response to said tip motion output signal, a second feedback signal representing variations in said amplitude of vibration of said probe tip occurring at said first frequency of vibration; and
   a computing system controlling said X-drive means and said Y-drive means to combine said first scanning movement and said second scanning movement so that said sample is traversed with said probe tip in a scanning direction.

2. The apparatus of claim 1, wherein
   said first and second frequencies of vibration are equal, and
   said second feedback signal represents variations in said amplitude of vibration of said probe tip occurring due to a combination of said first and second dithering vibrations.

3. The apparatus of claim 2, wherein
   said apparatus is operable in a first mode
   during operation of said apparatus in said first mode, said first and second frequencies are in phase,
   during operation of said apparatus in said first mode, an amplitude of said second dithering vibration is a ratio of an amplitude of said first dithering vibration, and
   said ratio causes dithering vibration combining said first and second dithering vibration to occur in said scanning direction.

4. The apparatus of claim 3, wherein
   said apparatus additionally comprises an oscillator generating a first output signal oscillating at said first dithering frequency,
   said X-drive means includes a first actuator and a first variable-gain amplifier driving said probe mounting surface in response to said first output signal by means of said first actuator,
   said Y-drive means includes a second actuator and a second variable-gain amplifier driving said probe mounting surface in response to said first output signal by means of said second actuator, and
   said computing system controls gain levels of said first and second variable-gain amplifiers so that said amplitude of said second dithering vibration is said ratio of an amplitude of said first dithering vibration.

5. The apparatus of claim 3, wherein
   said apparatus is additionally operable in a second mode, and
   during operation of said apparatus in said second mode, said first dithering vibration is combined with said second dithering vibration to move said probe tip in a circular pattern.

6. The apparatus of claim 5, wherein
   said apparatus additionally comprises an oscillator generating a first output signal oscillating at said first dithering frequency,
   said X-drive means includes a first actuator and a delay circuit driving said probe mounting surface, during operation of said apparatus in said second mode, in a predetermined phase angle relationship with said first output signal by means of said first actuator, and
   said Y-drive means includes a second actuator and a second variable-gain amplifier driving said probe mounting surface in response to said first output signal by means of said second actuator.

7. The apparatus of claim 5, comprising in addition a subroutine executing in said computing system to change operation of said apparatus from said second mode to said first mode when said second feedback signal exceeds a first predetermined threshold value.

8. The apparatus of claim 7, wherein said subroutine additionally changes operation of said apparatus said first mode to said second mode when said second feedback signal falls below a second predetermined threshold value.

9. The apparatus of claim 7, wherein
said subroutine determines a maximum slope angle through which said probe tip moves in said circular pattern adjacent a maximum slope of said sample surface as said second feedback signal exceeds said first predetermined threshold value, and
said first and second scanning movements are adjusted to continue relative motion between said probe tip and said sample surface at said maximum slope angle.

10. The apparatus of claim 8, wherein said subroutine causes said probe tip to move in said new scan angle after said second feedback signal exceeds said first predetermined threshold value operating in said second mode.

11. The apparatus of claim 2, wherein
said apparatus is operable in a second mode, and
during operation of said apparatus in said second mode, said first dithering vibration is combined with said second dithering vibration to move said probe tip in a circular pattern.

12. The apparatus of claim 11, wherein
said apparatus additionally comprises an oscillator generating a first output signal oscillating at said first dithering frequency,
said X-drive means includes a first actuator and a delay circuit driving said probe mounting surface, during operation of said apparatus in said second mode, in a predetermined phase angle relationship with said first output signal by means of said first actuator, and
said Y-drive means includes a second actuator and a second variable-gain amplifier driving said probe mounting surface in response to said first output signal by means of said second actuator.

13. The apparatus of claim 11, comprising in addition a subroutine executing in said computing system to change operation of said apparatus from said first mode to said second mode when said second feedback signal exceeds a first predetermined threshold value, and from said second mode to said first mode when said second feedback signal falls below a second predetermined threshold value.

14. The apparatus of claim 1, wherein
said apparatus is operable in a third mode,
during operation of said apparatus in said third mode, said first and second frequencies of vibration are sufficiently different to be separately detectable, and
said apparatus additionally comprises a third demodulator generating, in response to said tip motion output signal, a third feedback signal representing variations in said amplitude of vibration of said probe tip occurring at said second frequency of vibration.

15. The apparatus of claim 14, comprising in addition a subroutine executing in said computing system during operation of said apparatus in said third mode to combine said second and third feedback signals into a fourth feedback signal representing a slope of said sample surface in engagement with said probe tip.

16. The apparatus of claim 15, wherein said apparatus is additionally operable in a first mode, wherein
said first and second frequencies are equal and in phase,
said second feedback signal represents variations in said amplitude of vibration of said probe tip occurring due to a combination of said first and second dithering vibrations,
an amplitude of said second dithering vibration is a ratio of an amplitude of said first dithering vibration, and said ratio causes dithering vibration combining said first and second dithering vibration to occur in said scanning direction.

17. The apparatus of claim 16, wherein
said apparatus additionally comprises a first oscillator generating a first output signal oscillating at said first frequency of vibration and a second oscillator generating a second output signal oscillating at said second frequency,
said X-drive means includes a first actuator, a first variable gain amplifier driving said probe mounting surface by means of said first actuator, and a switch connecting said first variable gain amplifier to said first output signal during operation of said apparatus in said third mode and to said second output signal during operation of said apparatus in said first mode,
said Y-drive means includes a second actuator and a second variable-gain amplifier driving said probe mounting surface in response to said second output signal by means of said second actuator, and during operation of said apparatus in said first mode, said computing system controls gain levels of said first and second variable-gain amplifiers so that said amplitude of said second dithering vibration is said ratio of an amplitude of said first dithering vibration.

18. The apparatus of claim 16, wherein said subroutine changes operation of said apparatus from said third mode to said first mode when said second feedback signal exceeds a first predetermined threshold value.

19. The apparatus of claim 18, wherein said subroutine additionally changes operation of said apparatus from frst mode to said third mode when said second feedback signal falls below a second predetermined threshold value.

20. The apparatus of claim 18, wherein
said first demodulator additionally generates a first slope indicating value when a local slope of said sample surface in said X-direction is upward,
said second demodulator additionally generates a second slope indicating value when a local slope of said sample surface in said Y-direction is upward,
said subroutine determines an angle at which a maximum slope occurs by examining a ratio of said second and third feedback signals and said first and second slope indicating values, and
said first and second scanning movements are adjusted to continue relative motion between said probe tip and said sample surface at said maximum slope angle.

21. A method for determining topographical features of a sample surface, wherein said method comprises steps of:
a) traversing said sample surface with a scanning microscope probe in a scan direction, wherein said probe is vibrated in a Z-direction at an excitation frequency, and wherein said probe is driven though a dithering pattern along said sample surface by vibrations occurring in mutually perpendicular directions parallel to said sample surface;
b) determining if a slope of said sample surface exceeds a first predetermined threshold level by measuring variations in vibrations of said probe in said Z-direction due to said vibrations of said dithering pattern,
c) when said slope of said sample surface exceeds said predetermined threshold level, determining a maximum slope angle from said probe along said sample surface, at which said sample surface has a maximum slope, wherein said maximum slope angle is limited to an angle within ninety degrees of said scan direction, and d) continuing relative movement between said probe and said sample surface at said maximum slope angle.

22. The method of claim 21, wherein said dithering pattern includes circular motion of said probe.

23. The method of claim 22, wherein said step c) includes determining an angle of said circular motion through which said probe moves as said slope of said sample surface exceeds said predetermined threshold level.

24. The method of claim 21, wherein said dithering pattern includes motion of said probe in an X-direction at a first frequency, and in a Y-direction at a second frequency, with said first and second frequencies being substantially different from one another, and with said X-and Y-directions being perpendicular to one another.

25. The method of claim 24, wherein step b) includes determining an X-component of slope from an effect of vibration of said probe at said first frequency on vibration of said probe in said Z-direction;

determining a Y-component of slope from an effect of vibration of said probe at said second frequency on vibration of said probe in said Z-direction; and determining a maximum slope from said X- and Y-components thereof.

26. The method of claim 25, wherein step c) includes determining a ratio of said X- and Y-components of slope, and determining whether said X- and Y-components of slope are upward or downward.

27. The method of claim 21, wherein step d) occurs with said probe being vibrated at said maximum slope angle.

28. The method of claim 27, wherein step d is followed by e) determining if a slope of said sample surface falls below a first predetermined threshold level by measuring variations in vibrations of said probe in said Z-direction due to said vibrations of said dithering pattern, f) when said slope of said sample surface falls below said predetermined threshold level, returning to step a).

* * * * *